C. H. CRANE.
NUT LOCK.
APPLICATION FILED OCT. 13, 1917.
1,269,911.
Patented June 18, 1918.
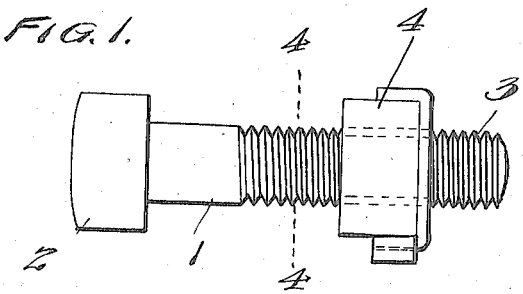
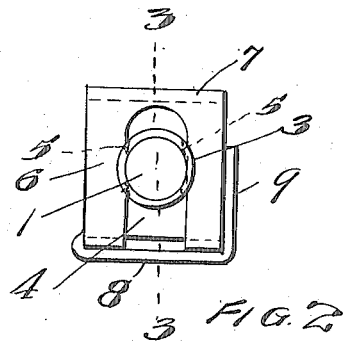
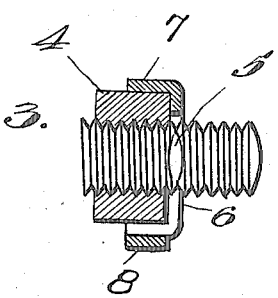
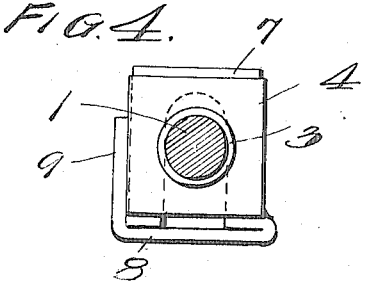
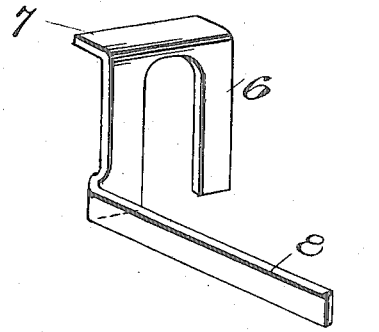
WITNESS
C. K. Davies
INVENTOR
C. H. CRANE.
BY Herman A. Phieipp
ATTORNEY

UNITED STATES PATENT OFFICE.

CHARLES HOWARD CRANE, OF KANSAS CITY, MISSOURI.

NUT-LOCK.

1,269,911. Specification of Letters Patent. Patented June 18, 1918.

Application filed October 13, 1917. Serial No. 196,410.

*To all whom it may concern:*

Be it known that I, CHARLES H. CRANE, a citizen of the United States, residing at Kansas City, in the county of Jackson and State of Missouri, have invented certain new and useful Improvements in Nut-Locks, of which the following is a specification.

The present invention relates to improvements in nut locks, and is designed primarily for the purpose of providing a simple, but effective, and comparatively cheap device for locking the nut on the bolt to prevent unlocking. The invention is of the type characterized by a flanged, bifurcated washer to straddle the threaded bolt, and made of malleable iron so that a tongue on the washer may be bent around two sides of the periphery of the washer and nut.

The invention consists in certain novel combinations and arrangements of parts as will be hereinafter described and claimed, and as illustrated in the accompanying drawings.

The accompanying drawings illustrate one complete example of the physical embodiment of the invention constructed according to the best mode I have so far devised for the practical application of the principles of my invention.

Figure 1 is a side elevation of a nut and bolt equipped with the lock of my invention.

Fig. 2 is an end view of the bolt showing the nut and locking device thereon.

Fig. 3 is a sectional view at line 3—3 of Fig. 2.

Fig. 4 is a sectional view at line 4—4 of Fig. 1.

Fig. 5 is a perspective view of the locking washer before application to the threaded bolt and nut.

In the preferred form of the invention as depicted in the drawings I have utilized a well known type of bolt 1 with the square head 2 and threads at 3 upon which the square nut 4 is screwed. At 5, 5, the threads on the bolt are mutilated, or filed off to present diametrically arranged grooves to receive the legs of the bifurcated washer 6, which is made in the form of a plate having an overhanging top flange 7 and the bent rearwardly projecting tongue 8.

The washer is preferably made of malleable iron or other suitable metal so that it may be bent by repeated blows with a hammer.

In using the lock, the nut is first screwed "home" and then the grooves or kerfs may be filed in the threads, or the kerfs or grooves may have already been prepared in the threads of the bolt. In any event, after the nut is in position the bifurcated washer is slipped over the threaded bolt and made to straddle it, with its legs in the grooves and the top flange of the washer resting on one of the faces of the nut. As thus positioned the tongue 8 is projecting outwardly parallel with the longitudinal axis of the bolt. By suitable blows of the hammer the ends of the legs of the washer are next bent over the face of the nut opposite that face engaged by the flange 7 and in this position the tongue 8 is projecting in a plane parallel with the transverse axis of the bolt, and finally, the malleable tongue is hammered to the angular form shown in Figs. 2 and 4, with its end 9 engaging one face of the nut, the flange 7 another face, and the ends of the legs of the washer engaging a third face, while the bifurcated washer which straddles the threaded bolt is in close engagement with the grooves or plane faces formed in diametrical arrangement in the bolt. In this manner the nut is locked on the bolt against any possible derangement, and can only be withdrawn when the folded portions of the washer are separated.

From the above description taken in connection with my drawings it is evident that I have provided an effective instrumentality for performing the requisite functions of a comparative perfect device of this character, and which fulfils the conditions set forth as the purpose of my invention.

What I claim is:—

The combination with a threaded bolt having diametrically opposed mutilated threads and a nut on the threaded bolt, of a bifurcated washer having a flange engaging one face of the nut, and straddling the mutilated threaded bolt, the ends of the bifurcated washer bent under to engage a face of the nut opposite the face engaged by the flange, and an angular, malleable tongue on one leg of the bifurcated washer bent across the two ends of the washer and having its end bent up against a third face of the nut, as described.

In testimony whereof I affix my signature in the presence of two witnesses.

CHARLES HOWARD CRANE.

Witnesses:
D. PARTING,
S. C. TUCKER.

Copies of this patent may be obtained for five cents each, by addressing the "Commissioner of Patents, Washington, D. C."